US005344811A

United States Patent [19]

Bunczk et al.

[11] Patent Number: 5,344,811

[45] Date of Patent: Sep. 6, 1994

[54] METHOD FOR DISPENSING COMPOSITIONS IN AN AQUEOUS SYSTEM

[75] Inventors: Charles J. Bunczk, Norristown; Peter A. Burke, Downingtown, both of Pa.

[73] Assignee: Kiwi Brands Inc, Douglassville, Pa.

[21] Appl. No.: 47,780

[22] Filed: Apr. 15, 1993

Related U.S. Application Data

[63] Continuation of Ser. No. 744,323, Aug. 13, 1991, abandoned, which is a continuation-in-part of Ser. No. 426,793, Oct. 26, 1989, Pat. No. 5,049,299.

[51] Int. Cl.$^5$ .................... A01N 25/30; A01N 25/00; C05G 3/02

[52] U.S. Cl. .................................. 504/192; 504/250; 504/354; 71/DIG. 1

[58] Field of Search ..................... 252/106, 107, 302; 134/22.14; 71/64.01, 64.08, 904, DIG. 1; 422/28; 504/101, 187, 189, 192, 250, 354

[56] References Cited

U.S. PATENT DOCUMENTS

| | | | |
|---|---|---|---|
| 3,326,806 | 6/1967 | Dolby | 252/106 |
| 3,380,923 | 4/1968 | Beach | 252/106 |
| 3,432,494 | 5/1969 | Chiddix et al. | 504/192 |
| 3,444,244 | 5/1969 | Newallis et al. | 504/354 |
| 3,829,386 | 8/1974 | Wegst et al. | 252/135 |
| 3,894,149 | 7/1975 | Mast | 424/200 |
| 4,313,847 | 2/1982 | Chasin et al. | 252/356 |
| 4,461,641 | 7/1984 | Abildt et al. | 71/93 |
| 4,793,988 | 12/1988 | Casey et al. | 424/7.1 |
| 4,911,858 | 3/1990 | Bunczk et al. | 252/106 |
| 4,954,338 | 9/1990 | Mattox | 424/78 |

FOREIGN PATENT DOCUMENTS

| | | | |
|---|---|---|---|
| 739633 | 3/1970 | Belgium | 71/64.8 |

OTHER PUBLICATIONS

"An Overview of Phenomena Involving Surfactant Mixtures" by John F Scamehorn. American Chemical Society; 1986; pp. 1-26.

*Primary Examiner*—Gary P. Straub
*Assistant Examiner*—Timothy C. Vanoy
*Attorney, Agent, or Firm*—John Lezdey

[57] ABSTRACT

A method for dispensing an emulsion or a water soluble composition in an aqueous medium comprising the steps of introducing said water soluble composition and at least one non-ionic or anionic surfactant into water so that the resulting concentration of surfactant or surfactant mixture in the water is less than the critical micelle concentration.

5 Claims, 3 Drawing Sheets

METHOD FOR DISPENSING COMPOSITIONS IN AN AQUEOUS SYSTEM

RELATED APPLICATIONS

This application is a continuation of application Ser. No. 07-744,323 filed Aug. 13, 1991, now abandoned, which was a continuation-in-part of application Ser. No. 07-426,793 filed Oct. 26, 1989, now U.S. Pat. No. 5,049,299.

FIELD OF THE INVENTION

The present invention relates to a method for dispensing an emulsion or a water soluble composition in an aqueous medium together with at least one surfactant. More particularly, there is provided a method for more effectively controlling the dilution so that the surfactant is dispensed with a chemical composition at less than the critical micelle concentration (CMC).

There is especially provided a method for more effectively dispensing a sanitizing agent, especially a halophor-containing liquid lavatory cleansing composition, in response to the flushing of a toilet.

BACKGROUND OF THE INVENTION

There are many compositions which are either dispensed with or metered into aqueous systems in combination with surfactants. These compositions include herbicides, insecticides and fertilizers for the treatment of soil and crops. Also, wax compositions are metered into car washes, fabric softeners are metered into washers, and fabric treatment compositions are metered into washers and extractors.

In treating toilet flush water with chemicals so as to produce desirable effects such as bowl aesthetics, cleaning, disinfection, deodorization, etc., it is desirable that the chemicals be dispensed into the flush water automatically each time the toilet is flushed. The prior art discloses numerous solid lavatory cleansing blocks which have the capability of automatically dispensing metered amounts of chemicals to effect cleaning and sanitizing. However, prior to the present invention liquid cleaners which contain a halophor sanitizing agent have not been available that are responsive to flushing.

Generally, the liquid cleansing compositions which are presently available do not contain a sanitizing agent. Most prior art liquid cleaners merely contain surfactants, dyes, perfumes, and other fillers to provide cleaning and sudsing with an indicator.

Automatically dispensed toilet bowl cleaning and/or sanitizing products, which contain dyes to provide a visual signal to the user that the product is being dispensed, are well known. Such products are sold in the United States under the brand names VANISH AUTOMATIC (Drackett Products), TY-D-BOL AUTOMATIC (Kiwi Brands, Inc.) and SANIFLUSH AUTOMATIC (Boyle-Midway). All of them provide a color to the bowl water which persists between flushings. U.S. Pat. No. 3,504,384, Radlevy et al, issued Apr. 7, 1970, discloses a dual compartment dispenser for automatically dispensing a hypochlorite solution and a surfactant/dye solution to the toilet bowl during flushing. The dye which is taught in the patent is Disulfide Blue VN150. This dye is resistant to oxidation to a colorless state by hypochlorite; thus, it provides a persistent color to the toilet bowl water, even in the presence of the hypochlorite.

In order to meet the Environmental Protection Agency's efficacy data requirements for in-tank sanitizer products claims for effectiveness, it is necessary that the user be able to determine the product effectiveness. That is, the color, or some other indicator must show that the sanitizing ingredient is still present in a sanitizing amount. Consequently, it is essential that the sanitizing agent have the same life in the sanitizing product as the color indicator.

The use of iodine-containing formulations have been previously considered as sanitizing agents for toilets because of their greater sanitizing capabilities than chlorine-containing agents. However, the iodine-containing agents have not been previously employed in automatic dispensing liquid toilet compositions because they yield an unacceptable color in the toilet bowl.

U.S. Pat. Nos. 3,728,449 and 4,207,310 disclose iodophors which may be used in the present invention.

It is an object of the invention to provide a more effective method of dispensing emulsions or water soluble compositions with surfactants in an aqueous system.

It is a further object of the present invention to provide a method for dispensing a liquid lavatory cleansing and sanitizing It is a further object of the present invention to provide a method for metering the sanitizing effect of the iodine released in liquid iodophor-containing lavatory cleansing compositions.

It is an object of the invention to provide a means for dispensing chemical compositions with surfactants in a water system.

It is yet another object to effectively dispense herbicides, insecticide, and fertilizers on crop and soil.

SUMMARY OF THE INVENTION

According to the present invention there is provided a method for dispensing an emulsion or a water soluble composition in an aqueous medium. The method comprises introducing the composition and at least one nonionic or anionic surfactant into water so that the resulting concentration of surfactant in the water is less than the critical micelle concentration of the surfactant or the surfactant mixture.

The invention is particularly advantageous for dispensing solutions or emulsions such as pesticides, fungicides, herbicides, fertilizers, and the like over large areas, for example, in the treatment of soil and crop.

The invention can also be utilized in car washes, for example, in the administration of waxes.

In industrial uses, the method of the invention can be used to administer agents for fabric treatment, processing of fruits and vegetables, and industrial cleaning.

The present invention also provides a means for dispensing a water soluble composition comprising a nontoxic phosphate-free composition containing halophors into the toilet.

It is a further object of the present invention to provide a method for metering the sanitizing effect of the iodine released in liquid iodophor-containing lavatory cleansing compositions.

It is an object of the invention to provide a means for dispensing chemical compositions with surfactants in a water system.

It is yet another object to effectively dispense herbicides, insecticide, and fertilizers on crop and soil.

SUMMARY OF THE INVENTION

According to the present invention there is provided a method for dispensing an emulsion or a water soluble composition in an aqueous medium. The method comprises introducing the composition and at least one nonionic or anionic surfactant into water so that the resulting concentration of surfactants in the water is predominantly surfactant monomers and is less than the critical micelle concentration of the surfactant or the surfactant mixture.

The invention is particularly advantageous for dispensing solutions or emulsions such as pesticides, fungicides, herbicides, fertilizers, and the like over large areas, for example, in the treatment of soil and crop.

The invention can also be utilized in car washes, for example, in the administration of waxes.

In industrial uses, the method of the invention can be used to administer agents for fabric treatment, processing of fruits and vegetables, and industrial cleaning.

The present invention also provides a means for dispensing a water soluble composition comprising a non-toxic phosphate-free liquid lavatory cleansing and sanitizing composition into a flush toilet. More particularly, the invention meters a liquid composition comprising 1) a nonionic or anionic detergent iodine complex or halophor or chorine release agent in an amount so as to provide at least 0.2% by weight, preferably, about 0.4 to about 0.8% by weight of elemental iodine; 2) a nonionic or anionic surfactant in an amount to provide monomers at the time of use, 3) optionally, about 0.5% to 10% of a water soluble acid dye, and 4) water.

It has been found that the presence of phosphates, particularly phosphoric acid, is not required for the stability of the lavoratory cleansing composition if the nonionic or anionic surfactant is present in an amount to provide monomers at the time of use.

To arrive at the critical micelle concentration of the various surfactants which may be utilized, reference should be made, for example, to the article of John F. Scamehorn entitled "An Overview of Phenomena Involving Surfactant Mixtures", American Chemical Society, 1986, which is herein incorporated by reference.

The halophor containing lavatory cleansing compositions of this invention generally contain elemental iodine in an amount that usually does not exceed 1%, but is more generally in the range of 0.4% to 0.8% iodine. Higher amounts are not required to yield the desired biocidal effect and could interfere with the desired color.

The lavatory cleaning compositions can optionally and advantageously, also include up to about 2% of at least one water-soluble iodide selected from the group consisting of hydrogen iodide and inorganic iodides, such as potassium iodide, sodium iodide or calcium iodide. Potassium iodide is preferred.

An important attribute of the iodophor compositions of the invention is their sanitizing activity. It has been found that the new compositions possess a microbiocidal action against *Staphylococcus aureus* (ATCC-6538), *Salmonella choleraesuis* (ATCC-10708) and odor causing microorganisms *Brevibacterium ammoniagenes* (ATCC-6871) and *Proteus Vulgaris* (ATCC-8427). The microbiologic testing indicates that full germicidal activity of the iodophor is not modified by its combination into the new compositions. In fact, it has been surprisingly found that the use of the dye enhances the biocidal activity of the composition.

It has been further found that methyl dimethyl propoxylene ammonium chloride is compatible in the iodophor composition and can be incorporated therein to provide additional biocidal activity. An amount of up to 2% by weight, preferably 0.2–0.8%, may be utilized to achieve the desired effect.

The iodophor compositions of the present invention have been found to be non-toxic when tested according to the method described in the *New and Revised Health Effects Test Guidelines* 1984, (PB84-233295), U.S. Department of Commerce, National Technical Information Service.

Other objects and a more complete understanding of the invention will be had by referring to the following description, taken in conjunction with the accompanying drawings, in which:

DESCRIPTION OF THE PREFERRED EMBODIMENTS

According to one embodiment of the invention, a liquid non-phosphate containing lavatory cleansing and sanitizing composition is provided for metering into a toilet bowl during flushing. The composition comprises a sanitizing agent, for example, an iodophor or a complex of a nonionic or anionic detergent and iodine in an amount to provide at least 0.2% by weight, preferably about 0.4 to about 0.8% by weight of elemental iodine; a nonionic or anionic surfactant in an amount to result in an equilibrium of the surfactants as monomers; optionally about 0.5% to 10% of a water soluble acid dye and the remainder water. Other optional ingredients may be added such as a fragrance, perfume, or other biocidal agents, such as methyl dimethyl propoxylene ammonium chloride.

A suitable lavatory cleaning composition in accordance with the invention comprises an amount of iodophor or detergent-iodine complex to provide about 0.4 to 0.8% by weight of elemental iodine. Utilizing a commercial product of West Agro Inc. sold under the name "Clean Front Concentrate" which is an alpha-(p-nonylphenyl)-omega-hydroxypoly (oxyethylene)-iodine complex, the amount is about 1.9 to 4.0 percent by weight of composition. The amount of anionic or nonionic surfactant is generally about 2% to 8% by weight depending upon the surfactant and the iodophor utilized. The acid dye in the amount of about 0.5% to 10% provides a suitable color to the composition. The remainder of the ingredients is water and any optional materials that may be added.

Figure 3:
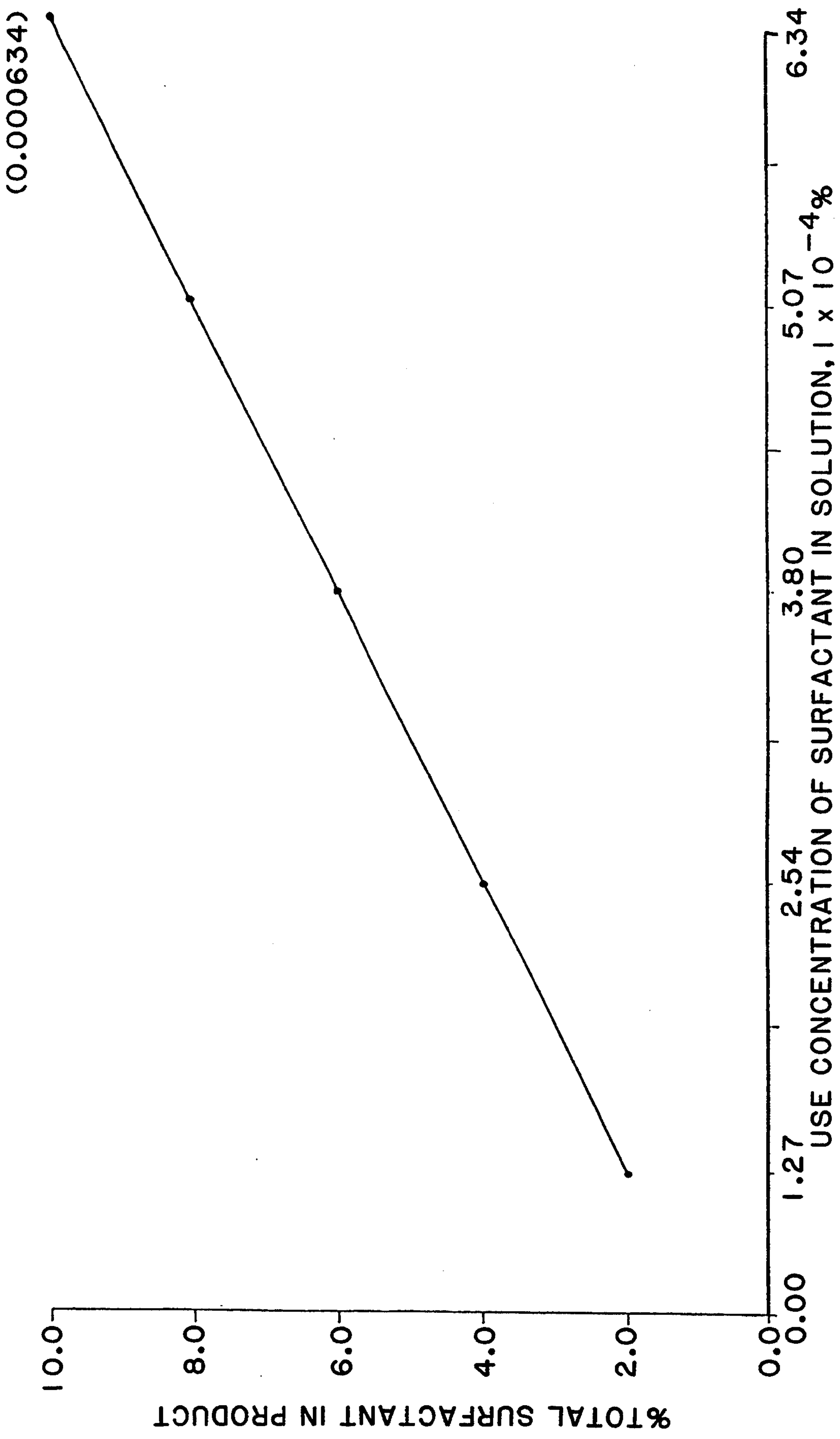
FIG. 3 shows that the surfactant concentration of a composition of the invention yields monomers.

A typical lavatory product which will be utilized in a household comprises about 360 g of composition per dispenser bottle. The amount is generally appropriate for 300 average flushes. There is generally about 18,925 g of dilution water per flush which amounts to 5,677,500 cc of water utilized with the product. In FIG. 3 there is shown that the surfactant concentration of a typical formulation yields monomers in solution since the product is below the Critical Micelle Concentration for the surfactants employed. The total surfactant concentration based on the iodophor is about 70%.

This invention further provides a more efficient method of dispensing chemical compositions by utilizing a synergistic effect with surfactants to accomplished these goals at concentrations far below those commonly used.

The long term implications are that these new mixtures use significantly less materials that are energy intensive to produce, and when used at these novel minimal concentrations, also provide less effluent material that has to be biodegraded in treatment plants or natural waterways.

The common practice and mechanism of cleaning or dispensing chemical compositions with surfactants is to use surfactants at a concentration in use dilution that is higher than the critical micelle concentration for the surfactant of choice. This is because the micelles have the capability in this state to solubilize, emulsify, and dislodge soils in cleaning for removal and rinsing away. At less than the critical micelle concentration it has been long established that the surfactant molecules exist only as monomers, (that is as free independent units), and can actually have a negative effect upon cleaning. Micelles are distinct groups of monomers that occur when enough monomers are available to saturate the solution, in this case water, they coalesce to form the micelle. At this point, (critical micelle concentration), the monomer concentration reaches equilibrium, and as more surfactant is added, these additional monomers form micelle. This critical concentration is easily measured by any of the well known methods, the most common being the change in surface tension of the liquid that the surfactant is being dissolved in. So in effect, by the simple process of surface tension measurement, one can determine if there are monomers or micelles present in the solution.

This invention also uses the monomer property of strong surface adsorption to carry the second component of the invention and maintain an active state rather than depend upon micelles (higher levels) to accomplish a cleaning or distribution effect.

In the case of a lavatory cleaning composition, the container is actually a metering device for dispensing a predefined amount to the water with each use to provide a use solution (dilution) that is predominately monomers and not micelles.

Surfactants in aqueous solutions generally exist in a state of equilibrium between micelles and a monomeric state. The monomer-micelle equilibria is dictated by the tendency of the surfactant components to form micelles and the interaction between surfactants in the micelle. The Critical Micelle Concentration (CMC) is the lowest surfactant concentration at which micelles form. The lower the Critical Micelle Concentration, the greater the tendency of the system to form micelles. The Critical Micelle Concentration is the concentration at which the micelles make this first appearance.

In situations where a quantitative estimate of the amount or concentration of micelles is desired, for example, in estimating solubilizing powers, or the effect of micelle concentrations on the chemical reactivities of constituent monomers or solubilized species, an area of research which is of considerable current interest, the CMC serves the purpose of giving a rough estimate of the monomer concentration in the solution. The micelle concentration in equivalents, therefore, can be closely approximated as the total concentration minus the CMC.

The method of determining the Critical Micelle Concentration (CMC) of surfactants is disclosed in article of Mukerjee et al entitled "Critical Micelle Concentration of Aqueous Surfactant Systems" National Bureau of Standards publication N SRDS-NBS 36 (1971), which is herein incorporated by reference. One of the methods disclosed involves the measurement of surface tension such as by the du Nouy ring detachment method.

Aqueous solutions of nonionic surfactants exhibit significantly lower surface tensions and consequently better wetting characteristics than water alone. In very dilute solutions, as surfactant concentration increases, surface tension decreases. This effect continues until a particular concentration is reached after which the surface tension remains nearly constant as surfactant concentration increases. This particular concentration is the "Critical Micelle Concentration" of the particular surfactant.

Table I describes the surface tension of some commercially available ethoxylated nonionic surfactants.

TABLE I

| | Concentration % weight Surface Tensions Dynes/cm @ 24.4 C. in water | | | | | |
|---|---|---|---|---|---|---|
| Surfactant | 0.0001 | 0.001 | 0.01 | 0.1 | 1.0 | CMC % wt |
| NEODOL 91-6 | 62 | 53 | 33 | 29 | 29 | 0.025 |
| NEODOL 91-8 | 63 | 54 | 37 | 30 | 31 | 0.027 |
| NEODOL 23-6.5 | 53 | 33 | 28 | 28 | 28 | 0.0017 |
| NEODOL 25-7 | 51 | 32 | 30 | 30 | 30 | 0.0009 |
| NEODOL 25-9 | 54 | 35 | 31 | 30 | 30 | 0.0018 |
| NEODOL 25-12 | 59 | 39 | 34 | 34 | 34 | 0.0018 |
| NEODOL 45-7 | 46 | 31 | 29 | 29 | 29 | 0.0004 |
| NEODOL 45-13 | 50 | 41 | 36 | 34 | 33 | 0.006 |
| Linear 1012 primary alcohol (5.2 EO) | 58 | 42 | 27 | 26 | 26 | 0.0035 |
| Random secondary alcohol (7 EO) | 53 | 36 | 30 | 29 | 20 | 0.0025 |
| Nonylphenol (9 EO) | 57 | 42 | 32 | 32 | 32 | 0.0025 |
| Octylphenol (9.5 EO) | 58 | 49 | 31 | 30 | 30 | 0.011 |
| Linear 812 primary alcohol EO/PO nonionic (HLB13) | 63 | 50 | 32 | 29 | 30 | 0.013 |
| Tridecyl alcohol ethoxylate (HLB 13.1) 85% AM | 56 | 42 | 27 | 27 | 27 | 0.0077 |

The class of iodophors or detergent-iodine complexes which can be utilized in the lavatory cleansing compositions of the invention are iodine-synthetic detergent complexes such as prepared according to the process as disclosed in U.S. Pat. Nos. 2,977,315 and 4,271,149. The synthetic detergent can comprise one or more nonionic and/or anionic surface active agents having strong detergent and wetting properties.

The nonionic carriers suitable for use in the emulsions or water soluble compositions include all of the known nonionic carriers or complexing agents for iodine, but the preferred carriers are the ethoxylated nonionic detergent types which have been cleared for use in contact with food equipment. Suitable nonionic carriers include:

a. alkyl phenol ethylene oxide condensates wherein the alkyl group contains 8–12 carbon atoms and the condensate contains about 7–18 moles of ethylene oxide per mole of alkyl phenol;

b. nonionics of the type disclosed in the U.S. Pat. No. 2,759,869 and generally embraced by the formula:

$$HO(C_2H_4O)_x(C_3H_6O)_y(C_2H_4O)_{x'}-H$$

wherein y equals at least 15 and $(C_2H_4O)_{x+x'}$ equals 20 to 90 percent of the total weight of said compound;

c. nonionics which are ethoxylated partial esters of fatty acids with sugar alcohols such as sorbitol and suitably those containing an average of 1–3 ester groups and up 50 moles of ethylene oxide per molecule;

d. butoxy derivatives of polypropylene oxide, ethylene oxide, block polymers having molecular weights within the range of about 2,000–5,000;

e. nonionics represented by the formula:

$$(C_nH_{2n+1})C_6H_4(OCH_2CH_2)$$

where n equals at least 8 and ($OCH2CH_2$) equals 58 to 78 percent of the total weight of said component, and f. mixtures thereof.

Typical nonionic carriers falling within these types which are commercially available, and some of which utilized in the examples hereinafter appearing, include the following nonionic detergents:

"Igepal CO-630"=nonylphenol condensed with 9–10 moles of ethylene oxide

"Igepal CO-710"=nonylphenol condensed with 10–11 moles of ethylene oxide

"Igepal CO-730"=nonylphenol condensed with 15 moles of ethylene oxide

"Pluronic L62"=25 to 30 moles of polyoxypropylene condensed with 8.5 to 10.2 moles of ethylene oxide "Pluronic F68"=25 to 30 moles of polyoxypropylene condensed with 33 to 41 moles of ethylene oxide "Pluronic P85"=36 to 43 moles of polyoxypropylene condensed with 48 to 52 moles of ethylene oxide "Tween 21"=polyoxyethylene (4) sorbitan monolaurate "Tween 40"=polyoxyethylene (20) sorbitan monopalimitate "Tergitol XH"=butoxy monoether of mixed (ethylenepropylene) polyalkylene glycol having a cloud point of 90–100 C. and an average molecular weight of 3,300.

Preferred nonionics are the water-soluble condensation products of aliphatic alcohols containing from 8 to 22 carbon atoms, in either straight chain or branched configuration, with from 9 to 15 moles of ethylene oxide per mole of alcohol. Particularly preferred are the condensation products of alcohols having an alkyl group containing from about 9 to 15 carbon atoms with from about 9 to 12 moles of ethylene oxide per mole of alcohol.

The detergents or surfactants which form the iodophor can be the same or different from the surfactants which solubilize the iodophor.

Among the suitable anionic surface active agents which can be used for the formation of iodophors or as solubilizers in accordance with the present invention are those represented by the formula:

$$R-N(R')-CH_2-CH_x-SO_3-Y$$

wherein R is the radical $C_xH_{(2x+1)}$ CO; x being an integer of from 5 to 17 and R' is selected from group consisting of hydrogen, ($C_1$–$C_4$) alkyl and cyclohexyl radicals and Y is selected from the group consisting of salt-forming cations. The preferred anionic detergent compounds are of the well known groups of anionic surface active agents known as alkanoyl taurates and alkylaryl sulfonates such as alkyl benzene sodium sulfonate, the alkali metal salt of decyl diphenyl ether disulfonic acid, dodecyl diphenyl ether disulfonic acid and hexadecyl diphenyl ether sulfonic acid, and alkyl naphthyl sodium sulfonate. A preferred anionic surfactant is sodium methyl cocoyltaurate.

Other anionic surfactants suitable for use herein as solubilizers are the sodium alkyl glyceryl ether sulfonates, especially those ethers of higher alcohols derived from tallow and coconut oil; sodium coconut oil fatty acid monoglyceride sulfonates and sulfates; sodium or potassium salts of from about 1 to about 10 units of ethylene oxide per molecule and from about 8 to about 12 carbon atoms in the alkyl group; and sodium or potassium salts of alkyl ethylene oxide ether sulfates containing from about 1 to about 10 units of ethylene oxide per molecule and from about 10 to about 20 carbon atoms in the alkyl group.

Other useful anionic surfactants include the water soluble salts of esters of alpha-sulfonated fatty acids containing from about 6 to 20 carbon atoms in the fatty acid group and from about 1 to 10 carbon atoms in the ester group; water-soluble salts of 2-acyloxy-alkane-1-sulfonic acids containing from about 2 to 9 carbon atoms in the acyl group and from about 9 to 23 carbon atoms in the alkane moiety; alkyl ether sulfates containing from about 10 to 20 carbon atoms in the alkyl group and from about 1 to 30 moles of ethylene oxide; water-soluble salts of olefin sulfonates containing from about 12 to 24 carbon atoms; and beta-alkyloxy alkane sulfonates containing from about 1 to 3 carbon atoms in the alkyl group and from about 8 to 20 carbon atoms in the alkane moiety.

Examples of suitable dyes which can be utilized in the liquid lavatory compositions are Alizarine Light Blue B (C.I. 63010), Carta Blue VP (C.I. 24401), Acid Green 2G (C.I. 42085), Astragn Green D (C.I. 42040), Supranol Cyanine 7B (C.I. 42675), Maxilon Blue 3RL (C.I. Basic Blue 18), Alizarine Light Blue H-RL (C.I. Acid Blue 182), FD&C Blue No. 1, FD&C Green No. 3 and Acid Blue No. 9. Others are disclosed in the aforementioned U.S. Pat. Nos. 4,310,434 and 4,477,363, which are herewith incorporated by reference.

The liquid lavatory compositions may also contain perfumes to impart an acceptable odor to the flushing water. The perfume should be water dispersable and is suitably present in an amount up to 10% by weight. In this connection, it may be noted that the term "perfume" is intended to refer to any material giving an acceptable odor and thus materials giving a "disinfectant" odor such as essential oils, pine extracts and terpinolenes. Other suitable perfumes or fragrances are disclosed in U.S. Pat. No. 4,396,522 of Callicott et al, which is herein incorporated by reference.

If desired, other halophors may be added to the liquid lavatory compositions containing iodophors, for example, bromophors such as dibromopropamidine isethionate (sold under the trademark BROMOPOL), bromochlorodimethyl hydantoin, dibromodimethyl hydantoin, and 2-cyano-2, 2-dibromo acetamide, preferably in an amount up to about 5% by weight.

The system of the present invention is particularly suitable for use in applying agriculture chemicals such as paraquat, mono- and disodium methanearsonates, dinitro-o-sec-butylphenols, cacodylic acid which is sprayed in combination with an anionic or nonionic surfactant which is used at about 1000 to 5000 ppm level.

The present invention can be more fully appreciated from the following examples, which are given for illustrative purposes only and not to limit the invention. In the following examples and through the specification all percentages are percentages by weight unless otherwise indicated.

EXAMPLE 1

A liquid toilet bowl cleansing composition for use in a metering container is prepared by mixing the following:

| Ingredient | % by weight |
|---|---|
| Iodophor | 1.9-4 |
| Surfactant | 2-8 |
| Acid dye | 0.5-10 |
| Deionized water | QS |
| | 100.0 |

-continued

| Ingredient | Amount % weight |
|---|---|
| Water | 90.1 |
| | 100.0 |

The composition has a pH of 2.3.

The composition is then placed into a metering container which is responsive to the flushing of toilets.

EXAMPLE 3

A liquid toilet bowl cleansing composition is prepared by mixing the following:

| Ingredients | Amount % weight |
|---|---|
| alpha-(p-nonylphenyl)-omega-hydroxypoly (oxyethylene)-iodide complex | 3.8 |
| Igepal CO-630 | 4.0 |
| Igepal CO-730 | 1.0 |
| Potassium iodide | 0.2 |
| Acid Blue 9 dye | 1.5 |
| Acid Yellow 23 dye | 0.6 |
| Water | 88.9 |
| | 100.0 |

The specific gravity of the composition was 1.02+0.01.

Optionally, about 1% by weight of a perfume, for example, pine oil may be added. The results of efficacy testing of the composition based on EPA Efficacy Data Requirements in a metered dosage container is shown in the following Table II.

TABLE II

| TOILET # | FLUSH | TITRATABLE IODINE (PPB) | PRODUCT LIFE (FLUSHES) | CONTACT TIME NEEDED TO ACHIEVE 99.9% KILL (MINS.) STAPH. | SALM. | BREVI. | PROT. |
|---|---|---|---|---|---|---|---|
| | | | A. 10°-15° C. Toilets | | | | |
| 19 | 6 | 278 | 254 | 30 | 30 | 10 | 10 |
| | 150 | 276 | | 30 | 30 | 10 | 10 |
| | 231 | 334 | | — | — | — | — |
| | 240 | 349 | | 30 | 30 | 10 | 10 |
| 20 | 6 | 303 | 290 | 30 | 30 | 10 | 10 |
| | 150 | 297 | | 30 | 30 | 10 | 10 |
| | 231 | 282 | | — | — | — | — |
| | 240 | 259 | | 30 | 30 | 10 | * |
| 21 | 6 | 339 | 308 | 30 | 30 | 10 | |
| | 150 | 364 | | 30 | 30 | 10 | 10 |
| | 231 | 247 | | — | — | — | — |
| | 240 | 227 | | 30 | 30 | 10 | * |
| | | | B. 25°-30° C. Toilets | | | | |
| 22 | 6 | 184 | 260 | 30 | 30 | 10 | 10 |
| | 150 | 276 | | 30 | 30 | 10 | 10 |
| | 231 | 334 | | — | — | — | — |
| | 240 | 349 | | 30 | 30 | 10 | 10 |

Bowl Inlet Water Analyses - <0.02 ppm total available chlorine 7.1 to 7.8 pH
*Experimental Error - No result metering of said composition provides the toilet bowl with about 2 to 5 ppm of dye.

EXAMPLE 2

A liquid toilet bowl cleansing composition was prepared by mixing the following:

| Ingredient | Amount % weight |
|---|---|
| alpha-(p-nonylphenyl) omega-hydroxypoly (oxyethylene)-iodine complex | 3.8 |
| Igepal CO-630 (surfactant) | 4.0 |
| Acid Blue 9 dye | 1.5 |
| Acid Yellow 23 dye | 0.6 |

EXAMPLE 4

A liquid toilet bowl cleansing composition for use in metering container is prepared by mixing the following ingredients.

| Ingredients | Amount % weight |
|---|---|
| alpha-(p-nonylphenyl)-omega-hydroxypoly (oxyethylene)-iodine complex | 4.5 |
| Igepal CO-630 | 4.0 |
| Potassium iodide | 0.2 |
| Methyl dimethyl propoxylene ammonium chloride | 0.5 |

-continued

| Ingredients | Amount % weight |
|---|---|
| Acid Blue 9 dye | 2.0 |
| Water | 88.8 |
| | 100.0 |

EXAMPLE 5

| Ingredients | Amount % weight |
|---|---|
| alpha(p-nonylphenyl)omega hydroxypropyl (oxyethylene) iodine complex | 3.8 |
| Igepal CO-630 (9 to 9.5 E.O.) | 4.0 |
| Acid Blue 9 dye | 1.3 |
| Water | 90.9 |
| | 100.0 |

Figure 1:
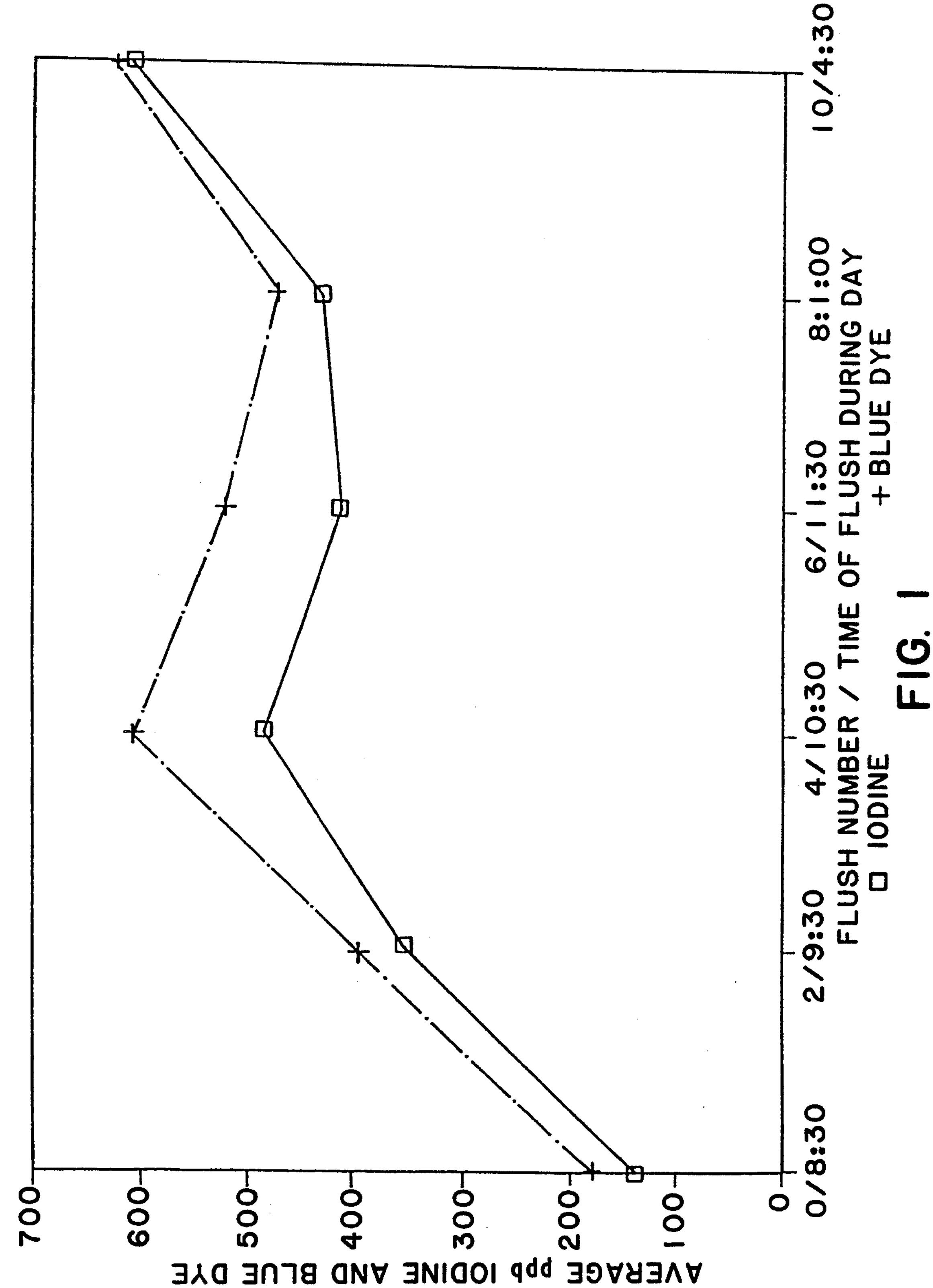
FIG. 1 shows the dye and iodine concentrations of the composition of the invention in a toilet bowl after a series of flushings.

The concentration of the dye and iodine in the toilet bowl after a series of flushing is shown in FIG. 1.

EXAMPLE 6

A liquid toilet bowl cleansing composition for metering into a toilet bowl is prepared by admixing the following ingredients:

| Ingredient | Amount % weight |
|---|---|
| Clean Front concentrate | 3.35 |
| Igepal CO-630 | 3.50 |
| Acid Blue No. 9 dye | 1.30 |
| Water | QS |
| | 100.0 |

Figure 2:
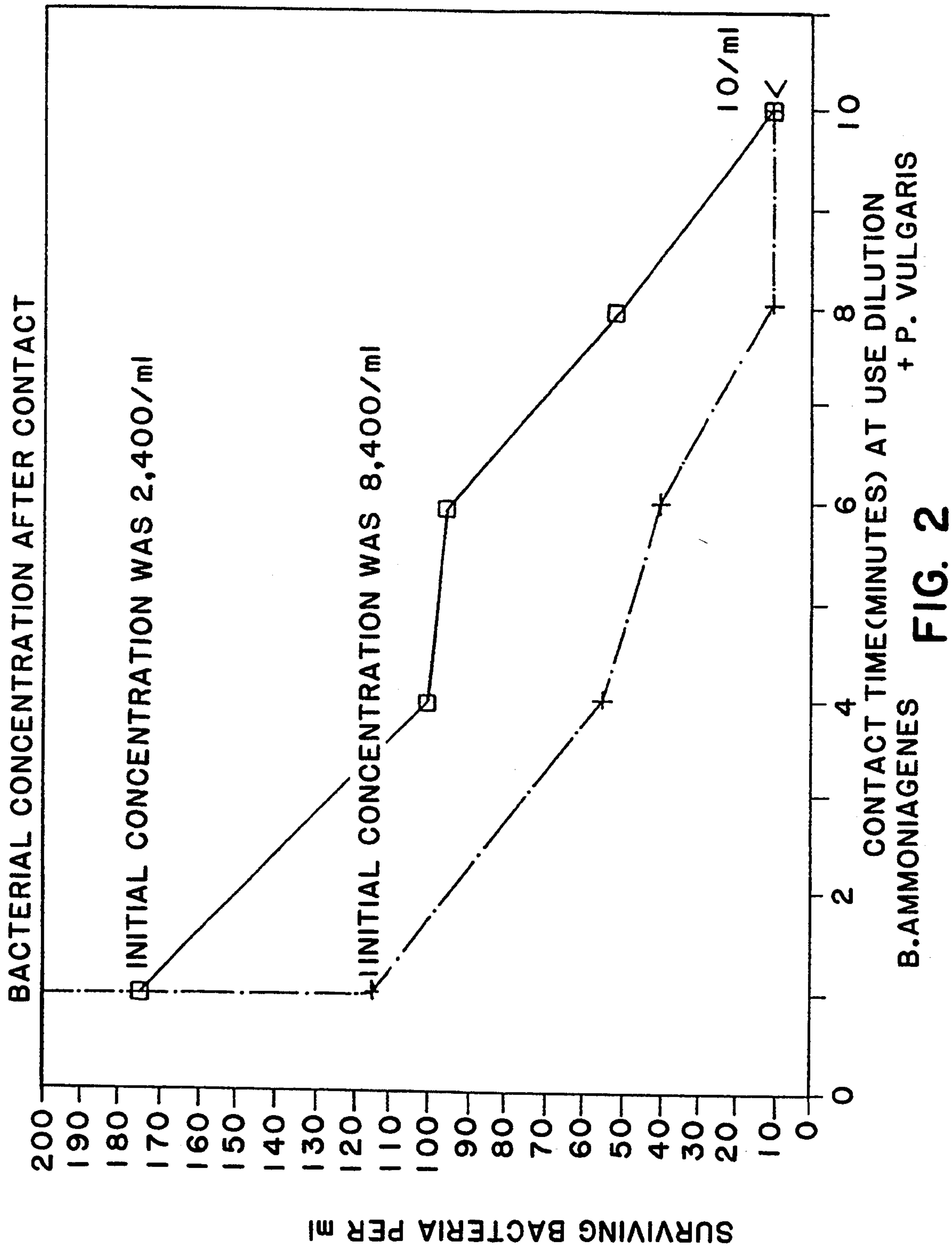
FIG. 2 illustrates the sanitizing properties of an iodophor composition of the invention.

The sanitizing properties of the prepared formulation is shown in FIG. 2.

EXAMPLE 7

A liquid lavatory composition for a metering container was prepared from the following ingredients:

| Ingredient | Amount % weight |
|---|---|
| alpha-(p-nonylphenol) omega-hydroxypoly (oxyethylene) - iodine complex | 3.8 |
| Igepal CO-630 (Surfactant) | 4.0 |
| Dodecyl Benzene Sulfonic Acid (Surfactant) | 1.0 |
| Acid Blue 9 Dye | 1.5 |
| Potassium Iodide | 0.2 |
| Water | 89.5 |
| | 100.0 |

EXAMPLE 8

A liquid lavatory composition for a metering container was prepared from the following ingredients:

| Ingredient | Amount % weight |
|---|---|
| alpha-(p-nonylphenol) omega-hydroxypoly (oxyethylene) - iodine complex | 3.8 |
| Igepal CO-630 (Surfactant) | 4.0 |
| Dodecyl Benzene Sulfonic Acid (Surfactant) | 2.0 |
| Acid Blue 9 Dye | 1.5 |
| Potassium Hydroxide to PH 2.5-3.0 | |
| Water | QS |
| | 100.0 |

EXAMPLE 9

A liquid lavatory composition for a metering container was prepared for the following ingredients:

| Ingredient | Amount % weight |
|---|---|
| alpha-(p-nonylphenol) omega-hydroxypoly (oxyethylene) - iodine complex | 3.8 |
| Dodecyl Benzene Sulfonic Acid (Surfactant) | 5.0 |
| Acid Blue 9 Dye | 1.5 |
| Potassium Iodide | 0.2 |
| Water | 89.5 |
| | 100.0 |

What is claimed is:

1. In a method for spraying a composition on crops, the improvement which comprises introducing a water soluble composition selected from the group consisting of pesticide, herbicide and fertilizer and at least one nonionic or anionic surfactant into the aqueous medium so that the resulting surfactant concentration in the aqueous medium is less than the critical micelle concentration of the surfactant or surfactant mixture and the composition is solubilized.

2. The method of claim 1 wherein said water soluble composition is a disinfectant.

3. The method of claim 1 wherein said nonionic surfactant is selected from the group consisting of:

alkyl phenol ethylene oxide condensates wherein the alkyl group contains 8-12 carbon atoms and the condensate contains about 7-18 moles of ethylene oxide per mole of alkyl phenol, of the formula:

$$(C_nH_{2n+1})C_6H_4(OCH_2CH_2)_xOH$$

wherein n equals at least 8 and ($C_2H_4O$) equals 58 to 78 percent of the total weight of said compound;

nonionics represented by the formula:

$$HO(C_2H_4O)_x(C_3H_6O)_y(C_2H_4O)_{x'}-H$$

where y equals at least 15 and $(C_2H_4O)_{x+x'}$ equals 20 to 90 percent of the total weight of said component;

nonionics which are ethoxylated partial esters of fatty acids with sugar alcohols containing an average of 1-3 ester groups and up 50 moles of ethylene oxide per molecule;

butoxy derivatives of polypropylene oxide, ethylene oxide, block polymers having molecular weights within the range of about 2,000-5,000, and mixtures thereof.

4. The method of claim 1 wherein the nonionic surfactant is an alkyl phenolethylene oxide condensate.

5. The method of claim 1 wherein the surfactant is nonylphenol ethoxylate.

* * * * *